United States Patent
Chen

(10) Patent No.: US 10,949,761 B2
(45) Date of Patent: Mar. 16, 2021

(54) PARTITIONING OF PACKET CLASSIFICATION RULES

(71) Applicant: Hangzhou DPtech Technologies Co., Ltd., Zhejiang Province (CN)

(72) Inventor: Zhongliang Chen, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 1036 days.

(21) Appl. No.: 15/460,933

(22) Filed: Mar. 16, 2017

(65) Prior Publication Data

US 2017/0372208 A1 Dec. 28, 2017

(30) Foreign Application Priority Data

Jun. 22, 2016 (CN) .......................... 201610472781.3

(51) Int. Cl.
*G06N 5/04* (2006.01)
*G06N 20/00* (2019.01)
(Continued)

(52) U.S. Cl.
CPC ............. *G06N 5/046* (2013.01); *G06N 5/025* (2013.01); *G06N 20/00* (2019.01); *H04L 45/04* (2013.01); *H04L 47/2441* (2013.01)

(58) Field of Classification Search
CPC ........ G06N 5/046; G06N 5/025; G06N 20/00; G06N 20/10; G06N 20/20; H04L 45/04; H04L 47/2441; G06F 16/95
See application file for complete search history.

(56) References Cited

U.S. PATENT DOCUMENTS

2005/0226235 A1* 10/2005 Kumar ................ H04L 47/2441
    370/386
2011/0038375 A1* 2/2011 Liu ........................ G06N 5/025
    370/392

(Continued)

FOREIGN PATENT DOCUMENTS

CN  101478551    7/2009
CN  101714948 A  5/2010

(Continued)

OTHER PUBLICATIONS

State Intellectual Property Office of the People's Republic of China, Office Action and Search Report issued in Application No. 201610472781.3, dated Sep. 4, 2019, 8 pages. (Submitted with Machine Translation).

(Continued)

*Primary Examiner* — Shane D Woolwine
(74) *Attorney, Agent, or Firm* — Greenblum & Bernstein, P.L.C.

(57) ABSTRACT

A method and device for partitioning packet classification rules are provided. According to an example of the method, one or more group are obtained by initially grouping bits included in a rule set on the network device. A local optimum combination of bits is determined for each group according to a correlation analysis on the group. A global optimum combination of bits having a minimum correlation coefficient and comprising fewest bits is determined from all the local optimum combinations of bits. The rule set is partitioned according to the global optimum combination of bits.

12 Claims, 5 Drawing Sheets

(51) Int. Cl.
    *G06N 5/02*     (2006.01)
    *H04L 12/715*     (2013.01)
    *H04L 12/851*     (2013.01)

(56)     References Cited

U.S. PATENT DOCUMENTS

2012/0047153 A1     2/2012     Thomas
2013/0166491 A1*   6/2013     Zhang ................ H04L 47/2441
                                                                        706/47
2014/0358929 A1    12/2014    Bailey et al.

FOREIGN PATENT DOCUMENTS

| CN | 102420831 | 4/2012 |
|---|---|---|
| CN | 103888350 | 6/2014 |
| CN | 105119960 | 12/2015 |

OTHER PUBLICATIONS

Chinese Office Action issued in China Patent Application No. 201610472781.3 dated Feb. 2, 2019.

\* cited by examiner

PARTITIONING OF PACKET CLASSIFICATION RULES

CROSS REFERENCE TO RELATED APPLICATIONS

This application claims priority to Chinese Patent Application No. 201610472781.3 entitled "a method and device for partitioning multi-domain packet classification rules" filed on Jun. 22, 2016, the entire content of which is incorporated herein by reference.

TECHNICAL FIELD

The present disclosure relates to partitioning of packet classification rules in the network communication technology.

BACKGROUND

According to a method for partitioning packet classification rules, for each of n rules, j bits may be selected from m bits included in the rule, and then the n rules are partitioned into $2^j$ rule subsets in a way that rules in the rule subsets are not repeated as much as possible, so the total number of rules in the $2^j$ rule subsets is fewest, and the occupied storage space is smallest.

Usually, there are two modes to be used for the selection of the j bits. Mode 1: the j bits may be selected one at a time, and every time one bit is selected, a rule subset obtained in the last time may be partitioned according to the selected bit, and eventually, an original rule set may be partitioned into $2^j$ rule subsets. Mode 2: j bits may be selected randomly every time, and the j bits selected this time may be different from those selected last time, and comparing the total number of rules in rule subsets obtained in current partitioning with the total number of rules in rule subsets obtained in last partitioning, if the total number of rules is reduced, the j bits selected currently are accepted until the number of partitioning times reaches a predetermined value or the partitioned rule subsets meet the requirements.

When mode 1 is adopted to select j bits, the cumulative value of the number of partitioning times follows a formula $$\sum_{k=0}^{j}(m-k)2^k,$$

thus, the partitioning complexity is high, and bits selected previously may have an influence on subsequent partitioning results.

When mode 2 is adopted to select j bits, the j bits are randomly selected to generate $C_m^j$ results. In such a case, it is very difficult to completely enumerate the partitioning results under each selection, and due to uncertainty of a random selection, rule subsets obtained by partitioning in this mode may not be able to meet requirements.

SUMMARY

For this reason, the present disclosure provides a method and device for partitioning multi-domain packet classification rules to improve the efficiency of rule set partitioning, and make the storage space of rule subsets after partitioning as small as possible.

According to a first aspect of examples of the present disclosure, a method for partitioning packet classification rules is provided, and the method includes the following blocks that:

obtaining, by a network device, one or more group by initially grouping bits included in a rule set on the network device, wherein each rule in the rule set includes m bits, and m is an integer greater than or equal to 2;

determining, by the network device, a local optimum combination of bits for each group according to a correlation analysis on the group;

determining, by the network device, a global optimum combination of bits having a minimum correlation coefficient and including fewest bits from all the local optimum combinations of bits; and partitioning, by the network device, the rule set according to the global optimum combination of bits.

According to a second aspect of examples of the present disclosure, a device for partitioning packet classification rules is provided, and the device includes: a processor and a machine-readable storage medium, wherein machine-executable instructions corresponding to a control logic for partitioning packet classification rule may be stored in the machine-readable storage medium, the control logic for partitioning packet classification rule includes a rule set, and by reading and executing the machine-executable instructions, the processor executes the following operations:

obtaining one or more group by initially grouping bits included in the rule set, wherein each rule in the rule set includes m bits, and m is an integer greater than or equal to 2;

determining a local optimum combination of bits for each group according to a correlation analysis on the group;

determining a global optimum combination of bits having a minimum correlation coefficient and including fewest bits from all the local optimum combinations of bits; and partitioning the rule set according to the global optimum combination of bits.

According to the present disclosure, one or more group may be obtained by grouping m bits in a rule. A local optimum combination of bits corresponding to each group may be obtained according to a correlation analysis on the group. Then a final global optimum combination of bits may be determined from all the local optimum combinations of bits. A predetermined rule set may be partitioned according to the global optimum combination of bits. In such a way, the computational complexity when the rule set is partitioned may be effectively reduced, thereby improving the partitioning efficiency of the rule set; and the fewer the number of partitioned rule subsets is, the fewer the repeated rules in the rule subsets are, so that an effect of making the storage space of the rule subsets as small as possible may be achieved.

DETAILED DESCRIPTION

Figure 1:
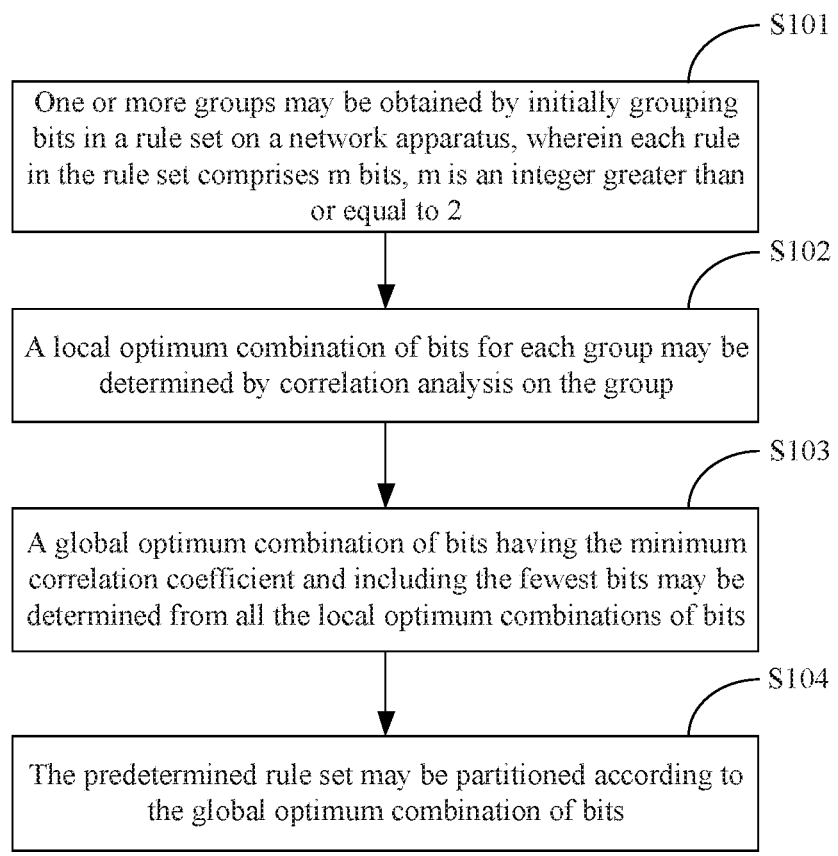
FIG. 1 is a flowchart of a method for partitioning packet classification rules according to an example of the present disclosure.

Illustrative examples are illustrated in detail here with reference to the accompanying drawings. When the following descriptions are involved with the accompanying drawings, same numbers in different accompanying drawings refer to same or similar elements unless stated otherwise. The embodiments described in the following sample examples do not represent all modes of execution consistent with the present disclosure. On the contrary, the illustrative examples are only examples of the device and method (consistent in some aspects and specified in appended claims) of the present disclosure.

Terms used in this application are adopted only for describing specific examples, rather than to limit this disclosure. Singular-form 'a', 'said' and 'the' used in the disclosure and the appended claims are also designed to include plural form unless other meanings are clearly shown in the context. It should be also understood that the term 'and/or' used herein refers to and contains any or all possible combinations of one or more associated listed items.

It should be understood that although the terms such as first, second and third and the like may be adopted to describe all kinds of information in this disclosure, the information should not be limited to these terms. These terms are only adopted for distinguishing same type of information from each other. For example, without departing from the scope of the application, first information also may be referred to as second information, and similarly, the second information also may be referred to as the first information. The meaning of terms depends on the context, for example, a word 'if' used here may be interpreted as 'when', 'while' or 'in response to determination'.

Packet classification refers to a process to classify packets based on a predetermined rule set according to information in the packets. The partitioning of packet classification rules may be implemented by pre-processing a predetermined rule set so as to generate rule subsets. In such a way, the speed to look up a rule may be effectively improved in the packet classification process, thereby improving the classification performance of packets.

A multi-domain packet classification mathematically involves, in essence, a multi-domain spatial point positioning problem. On basis of mathematical solutions to point positioning, multi-domain packet classification rules may be partitioned by using a heuristic method. Aspects of optimizing the heuristic method for partitioning multi-domain packet classification rules may include, improving the efficiency of partitioning, reducing storage space of rules, and the like.

In some heuristic methods for partitioning multi-domain packet classification rules based on bits, a high computational complexity and a low partitioning efficiency may be caused, and rule subsets obtained by partitioning may occupy a storage space not so small. However, the present disclosure may provide a method and device for partitioning packet classification rules, which save time to partition a rule set, improve efficiency of the partitioning, and make a storage space of partitioning-obtained rule subsets as small as possible.

Seeing FIG. 1, a flowchart of a method for partitioning packet classification rules according to an example of the present disclosure is illustrated. The method shown in FIG. 1 may be applied to a network device in which a predetermined rule set may be included, wherein, each rule in the rule set comprises m bits, and m is an integer greater than or equal to 2. The method may comprise the following blocks.

Block S101: one or more groups may be obtained by initially grouping the m bits in the rule set.

Suppose there are 4 rules in the predetermined rule set, and each rule comprises 8 bits, the four rules are respectively: R1: 10*011*1, R2: 01011010, R3: 1*1000*1, and R4: 11110000. In the present disclosure, 8 bits in each rule may be sequentially numbered from left to right, i.e. bit 1, bit 2 till bit 8 in order.

The 8 bits may be initially grouped so as to obtain one or more groups. For example, bit 4, bit 5 and bit 8 may be classified to a same group: bit 1 and bit 6 may be classified to another group; bit 2 and bit 3 may be classified to a group; and bit 7 may be classified to a group. Implementation of the initial grouping in this present disclosure may be in detail described in the following example, and will not be elaborated here.

Block S102: a local optimum combination of bits for each group may be determined according to a correlation analysis on the group.

In the present disclosure, rule subsets partitioned according to bits in each group in block S101 may be subjected to correlation analysis based on a heuristic method for correlation analysis, so that combinations of bits with the smallest correlation coefficient are obtained with respect to the partitioned rule subsets. A combination of bits including the fewest bits may be selected as a local optimum combination of bits of the group from the combinations of bits with the smallest correlation coefficient. The smaller the correlation coefficient for the rule subset is, the fewer the repeated rules in the rule subset are; and the fewer the bits included in the combination of bits are, the fewer the number of the rule subsets is. In such a way, the total number of rules in all the rule subsets will be fewer, and the storage space of the rule subsets also will be smaller. The correlation analysis on rule subsets partitioned according to bits in each group in the present disclosure concretely may see detailed descriptions in the following example, and will be not elaborated here.

According to the descriptions above, in the present disclosure, bit grouping may be performed based on bits firstly, and then each group may be subjected to correlation analysis. In such a way, an effect of partitioning overall data with a large computation amount into several data sets with a small computation amount may be achieved, so that in theory, the complexity of computation may be reduced, thus, the partitioning efficiency of packet classification rules may be improved.

Block S103: a global optimum combination of bits having the minimum correlation coefficient and including the fewest bits may be determined from all the local optimum combinations of bits.

Block S104: the predetermined rule set may be partitioned according to the global optimum combination of bits.

In the block S103 and the block S104, a local optimum combination of bits having the minimum correlation coefficient and including the fewest bits may be selected as a global optimum combination of bits by comparing all the local optimum combinations of bits. When the predetermined rule set is partitioned according to the global optimum combination of bits, because the correlation coefficient is the minimum, rules in the partitioned rule subsets are repeated fewest; and because the number of bits is fewest, the number of partitioned rule subsets is fewest. In such a way, the total number of rules in the rule subsets obtained by partitioning is fewest, and the storage space of the rule subsets is smallest.

The example above shows that: by grouping m bits in each rule, one or more groups may be obtained; then, according to a correlation analysis on each group, a local optimum combination of bits corresponding to each group may be obtained; a final global optimum combination of bits may be determined from all the local optimum combinations of bits; and the predetermined rule set may be partitioned according to the global optimum combination of bits. In such a way, the computational complexity when the rule set is partitioned may be effectively reduced, thereby improving the partitioning efficiency of the rule set; and the fewer the number of the partitioned rule subsets is, the fewer the repeated rules in the rule subsets are, thereby achieving an effect of making the storage space of the rule subsets as small as possible.

Figure 2:
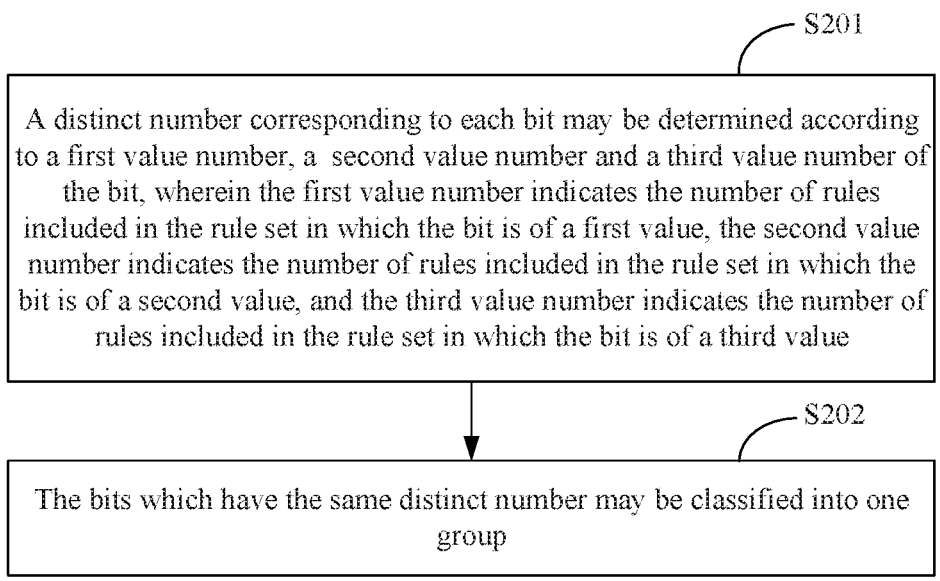
FIG. 2 is a flowchart illustrating an initial grouping on bits in the method for partitioning packet classification rules according to an example of the present disclosure.

Seeing FIG. 2, a flowchart illustrating initial grouping on bits according to an example of the present disclosure is shown. The flowchart shown in FIG. 2 describes how to obtain groups in the block S101 shown in FIG. 1 in detail on the basis of the flowchart shown in FIG. 1. The flowchart in FIG. 2 may include the following blocks.

Block S201: a distinct number for each bit may be determined according to a first value number, a second value number and a third value number of the bit, wherein the first value number indicates the number of rules included in the rule set in which the bit is of a first value, the second value number indicates the number of rules included in the rule set in which the bit is of a second value, and the third value number indicates the number of rules included in the rule set in which the bit is of a third value.

For convenience of description, in the present disclosure, '0' may be called as the first value, '1' may be called as the second value, and '*' may be called as the third value.

According to the predetermined rule set, beginning with bit 1, for each bit, the number of rules that the value of the bit therein is 0, the number of rules that the value of the bit therein is 1 and the number of rules that the value of the bit therein is * may be sequentially determined. For example, based on the illustration on the predetermined rule set in the block S101 above, the numbers of rules determined in the block are illustrated in table 1:

TABLE 1

|       | number of rules in which the bit is of 0 | number of rules in which the bit is of 1 | number of rules in which the bit is of * |
|-------|---|---|---|
| bit 1 | 1 | 3 | 0 |
| bit 2 | 1 | 2 | 1 |
| bit 3 | 1 | 2 | 1 |
| bit 4 | 2 | 2 | 0 |
| bit 5 | 2 | 2 | 0 |
| bit 6 | 3 | 1 | 0 |
| bit 7 | 1 | 1 | 2 |
| bit 8 | 2 | 2 | 0 |

When a predetermined rule set is partitioned based on a selected bit, a partitioning result may be obtained as follows: rules with the bit of 0 are classified to a "0" rule subset, rules with the bit of 1 are classified to a "1" rule subset, and rules with the bit of * are respectively classified to the "0" rule subset and the "1" rule subset. The partitioning result shows that: when the selected bit is 0 or 1, the total number of rules in the rule subsets is not increased in comparison with the number of rules in the original rule set, but the imbalance of rule subsets will be caused in all probability, i.e., the numbers of rules respectively in the "0" rule subset and the "1" rule subset are probably greatly different; and when the selected bit is *, the imbalance of rule subsets will not be caused, but the total number of rules in the rule subsets may be increased in comparison with the number of rules in the original rule set. Therefore, in the present disclosure, to take all above into consideration, a calculation rule may be predetermined, and the numbers of three rules corresponding to each bit are operated according to the calculation rule. And wherein, the numbers of three rules are the number of rules with the bit of 0, the number of rules with the bit of 1 and the number of rules with the bit of *. The operation result may be taken as a distinct number corresponding to the bit. The distinct number corresponding to the bit may show the approximate relation among the number of rules with the bit of 0, the number of rules with the bit of 1 and the number of rules with the bit of *.

In an example, the calculation rule described for determining the corresponding distinct number of each bit may be shown as follows:

distinct number $d=|\text{first value number}-\text{second value number}|+n*\text{third value number}$, wherein n is greater than zero.

It should be pointed out that the number of rules in the rule set is uncertain, even lots of rules may be included in the rule set, and many bits also may be included in each rule. So, in the present disclosure, the classification of bits may be controlled based on the value "n". Specifically, when n is smaller, the difference between the distinct numbers corresponding to different bits may be smaller, even more likely same. Thus, the value of n is likely to affect the classification result of bits according to the distinct numbers. The specific value "n" is not restricted in the present disclosure, and the classification of bits may be controlled by controlling the value of n according to actual needs. In addition, whether n is an integer is not restricted, and understandably, when n is an integer, the computational process in the present disclosure is facilitated.

By taking n=2 as an example, the distinct number of each bit calculated in the block is illustrated in table 2 as follows:

TABLE 2

|       | number of rules in which the bit is of 0 | number of rules in which the bit is of 1 | number of rules in which the bit is of * | distinct number d |
|-------|---|---|---|---|
| bit 1 | 1 | 3 | 0 | 2 |
| bit 2 | 1 | 2 | 1 | 3 |
| bit 3 | 1 | 2 | 1 | 3 |
| bit 4 | 2 | 2 | 0 | 0 |
| bit 5 | 2 | 2 | 0 | 0 |
| bit 6 | 3 | 1 | 0 | 2 |
| bit 7 | 1 | 1 | 2 | 4 |
| bit 8 | 2 | 2 | 0 | 0 |

As shown in table 2, the more the number of rules with the bit of * is, the larger the distinct number corresponding to the bit is; and when the number of rules with the bit of * is 0, the distinct number corresponding to the bit may be expressed as the difference between the numbers of rules in two rule subsets partitioned according to the bit. Through analysis for table 2, it may be determined that the smaller the distinct number corresponding to a bit is, the more balanced the rule subsets partitioned according to the bit are, thus, the bit is a better choice.

Block S202: the bits which have the same distinct number may be classified into one group.

In an example, based on the description in the block S202, the bits which have the same distinct number may be classified into a same group. For example, as shown in table 2, 8 bits may be partitioned into four groups, specifically include:

group with a distinct number of 0: bit 4, bit 5 and bit 8;

group with a distinct number of 2: bit 1, bit 6;

group with a distinct number of 3: bit 2, bit 3; and group with a distinct number of 4: bit 7.

The example above shows that the distinct number corresponding to each bit may be calculated, and then the bits may be partitioned according to the distinct numbers. In such a way, an overall data may be partitioned into multiple data sets, so that the complexity of computation may be effectively reduced, thereby improving the partitioning efficiency of packet classification rules. Meanwhile, because the distinct number may show the number of rules with the bit of * and show whether rule subsets partitioned according to the bit corresponding to the distinct number are approximately balanced, better combinations of bits may be preliminarily selected when bits are grouped according to the distinct numbers. In such a way, the efficiency of selecting optimum combination of bits may be improved, thereby improving the efficiency of the partitioning of packet classification rules.

Figure 3:
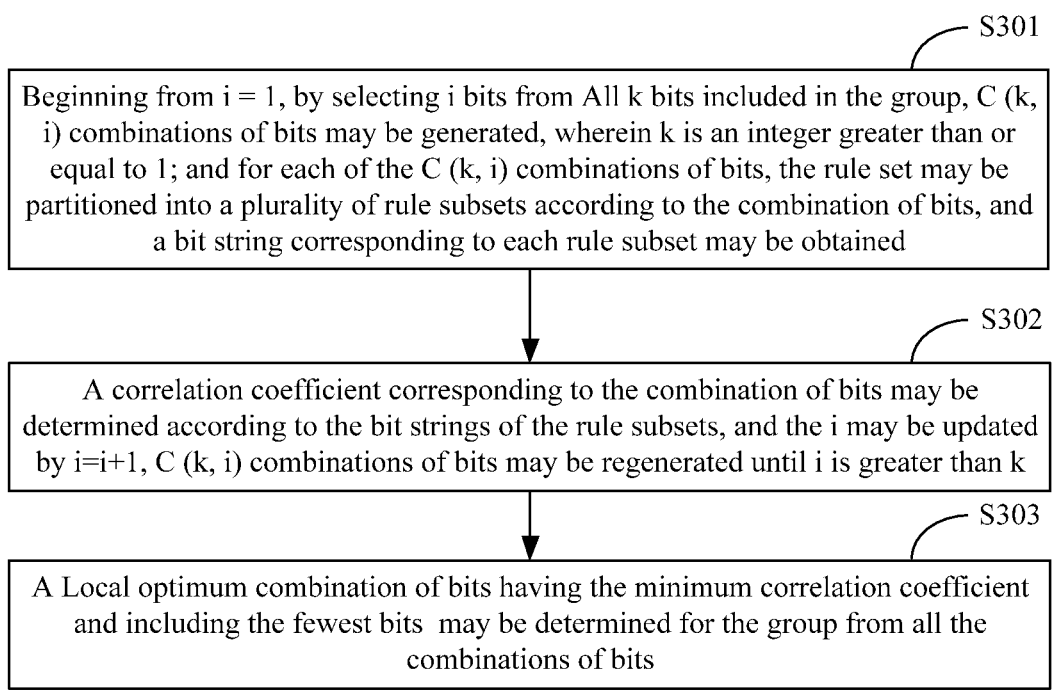
FIG. 3 is a flowchart illustrating correlation analysis on bit groups in the method for partitioning packet classification rules according to an example of the present disclosure.

Seeing FIG. 3, a flowchart illustrating correlation analysis on groups according to an example of the present disclosure is shown. The flowchart shown in FIG. 3 describes how to carry out correlation analysis on groups in the block S102 shown in FIG. 1 in detail on the basis of the flowchart shown in FIG. 1 and the flowchart shown in FIG. 2. The flowchart in FIG. 3 may include the following blocks.

Block S301: beginning from i=1, by selecting i bits from all k bits included in the group, C (k, i) combinations of bits may be generated, wherein k is an integer greater than or equal to 1; and for each of the C (k, i) combinations of bits, the rule set may be partitioned into a plurality of rule subsets according to the combination of bits, and a bit string corresponding to each rule subset may be obtained.

Block S302: a correlation coefficient corresponding to the combination of bits may be determined according to the bit strings respectively corresponding to the multiple rule subsets, and update the i by i=i+1, C (k, i) combinations of bits are regenerated until i is greater than k.

Block S303: a local optimum combination of bits having the minimum correlation coefficient and including the fewest bits may be determined for the group from all the combinations of bits.

In an example, based on the example shown in FIG. 2, the blocks S301-S303 are described in detail as follows.

In an example, the groups may be subjected to correlation analysis in a small-to-large distinct number sequence.

I. correlation analysis on groups with a distinct number of 0:

[1] the number of bits included in the combination is 1:

(1) a combination includes a bit 4, and according to the combination, a predetermined rule set may be partitioned into:

"0" rule subset: R1 and R3, in the "0" rule subset, R1 and R3 are included, so in a bit string corresponding to the "0" rule subset, the first bit and the third bit may be set as 1, and the other two bits may be set as 0, thus, the bit string corresponding to the "0" rule subset is 1010; and "1" rule subset: R2 and R4, according to the description above, a bit string corresponding to the "1" rule subset is 0101.

In another example, the number of bits of which the value is 1 in the bit strings of all the rule subsets corresponding to the combination and the number of non-zero bit strings may be determined. The non-zero bit string refers to that all bits in the bit string are not 0. For example, the number of bits of which the value is 1 in the bit strings of all the rule subsets corresponding to the combination is 2+2=4, and the number of non-zero bit strings is 2.

Then, a correlation coefficient corresponding to the combination may be obtained according to a ratio of the number of bits of which the value is 1 to the number of non-zero bit strings. For example, the correlation coefficient corresponding to the combination including the bit 4 is (2+2)/2=2.

(2) a combination includes a bit and according to the combination, the predetermined rule set may be partitioned into:

"0" rule subset: R3 and R4, a bit string corresponding to the "0" rule subset is 0011;

"1" rule subset: R1 and R2, a bit string corresponding to the "1" rule subset is 1100; and a correlation coefficient corresponding to the combination including the bit 5 is (2+2)/2=2.

(3) a combination includes a bit 8, and according to the combination, the predetermined rule set may be partitioned into:

"0" rule subset: R2 and R4, a bit string corresponding to the "0" rule subset is 0101;

"1" rule subset: R1 and R3, a bit string corresponding to the "1" rule subset is 1010; and a correlation coefficient corresponding to the combination including the bit 8 is (2+2)/2=2.

[2] the number of bits included in a combination is 2:

(1) a combination includes a bit 4 and a bit 5, and according to the combination, the predetermined rule set may be partitioned into:

"00" rule subset: R3, a bit string corresponding to the "00" rule subset is 0010;

"01" rule subset: R1, a bit string corresponding to the "01" rule subset is 1000;

"10" rule subset: R4, a bit string corresponding to the "10" rule subset is 0001;

"11" rule subset: R2, a bit string corresponding to the "11" rule subset is 0100; and a correlation coefficient corresponding to the combination including the bit 4 and the bit 5 is (1+1+1+1)/4=1.

(2) a combination includes a bit 4 and a bit 8, and according to the combination, the predetermined rule set may be partitioned into:

"00" rule subset: empty, a bit string corresponding to the "00" rule subset is 0000;

"01" rule subset: R1 and R3, a bit string corresponding to the "01" rule subset is 1010;

"10" rule subset: R2 and R4, a bit string corresponding to the "10" rule subset is 0101;

"11" rule subset: empty, a bit string corresponding to the "11" rule subset is 0000; and a correlation coefficient corresponding to the combination including the bit 4 and the bit 8 is (0+2+2+0)/2=2.

(3) a combination includes a bit 5 and a bit 8, and according to the combination, the predetermined rule set may be partitioned into:

"00" rule subset: R4, a bit string corresponding to the "00" rule subset is 0001;

"01" rule subset: R3, a bit string corresponding to the "01" rule subset is 0010;

"10" rule subset: R2, a bit string corresponding to the "10" rule subset is 0100;

"11" rule subset: R1, a bit string corresponding to the "11" rule subset is 1000; and a correlation coefficient corresponding to the combination including the bit 5 and the bit 8 is (1+1+1+1)/4=1.

[3] the number of bits included in a combination is 3:

a combination includes a bit 4, a bit 5 and a bit 8, and according to the combination, the predetermined rule set may be partitioned into:

"000" rule subset: empty, a bit string corresponding to the "000" rule subset is 0000;

"001" rule subset: R3, a bit string corresponding to the "001" rule subset is 0010;

"010" rule subset: empty, a bit string corresponding to the "010" rule subset is 0000;

"011" rule subset: R1, a bit string corresponding to the "011" rule subset is 1000;

"100" rule subset: R4, a bit string corresponding to the "100" rule subset is 0001;

"101" rule subset: empty, a bit string corresponding to the "101" rule subset is 0000;

"110" rule subset: R2, a bit string corresponding to the "110" rule subset is 0100;

"111" rule subset: empty, a bit string corresponding to the "111" rule subset is 0000; and a correlation coefficient corresponding to the combination including the bit 4, the bit 5 and the bit 8 is (0+1+0+1+1+0+1+0)/4=1.

The minimum value 1 of the corresponding correlation coefficients for all the listed combinations above may be taken as the correlation coefficient corresponding to a group with the distinct number of 0. A combination including the fewest bits in the combinations with the correlation coefficient of 1 may be taken as the local optimum combination of bits of a group with the distinct number of 0. For example, the local optimum combination of bits of the group with the distinct number of 0 may be a combination including the bit 4 and the bit 5, or a combination including the bit 5 and the bit 8.

II. correlation analysis on groups with the distinct number of 2:

[1] the number of bits included in a combination is 1:

(1) a combination includes a bit 1, and according to the combination, the predetermined rule set may be partitioned into:

"0" rule subset: R2 a bit string corresponding to the "0" rule subset is 0100;

"1" rule subset: R1, R3 and R4; a bit string corresponding to the "1" rule subset is 1011; and a correlation coefficient corresponding to the combination including the bit 1 is (1+3)/2=2.

(2) a combination includes a bit 6, and according to the combination, the predetermined rule set may be partitioned into:

"0" rule subset: R2, R3 and R4, a bit string corresponding to the "0" rule subset is 0111;

"1" rule subset: R1, a bit string corresponding to the "1" rule subset is 1000; and a correlation coefficient corresponding to the combination including the bit 6 is (3+1)/2=2.

[2] the number of bits included in a combination is 2:

(1) a combination includes a bit 1 and a bit 6, and according to the combination, the predetermined rule set may be partitioned into:

"00" rule subset: R2, a bit string corresponding to the "00" rule subset is 0100;

"01" rule subset: empty, a bit string corresponding to the "01" rule subset is 0000;

"10" rule subset: R3 and R4, a bit string corresponding to the "10" rule subset is 0011;

"11" rule subset: R1, a bit string corresponding to the "11" rule subset is 1000; and a correlation coefficient corresponding to the combination including the bit 1 and the bit 6 is (1+0+2+1)/3=1.3.

The above analysis shows that the correlation coefficient corresponding to the group with the distinct number of 2 is 1.3, and the local optimum combination of bits of the group with the distinct number of 2 includes the bit 1 and the bit 6.

III. correlation analysis on groups with the distinct number of 3:

[1] the number of bits included in a combination is 1:

(1) a combination includes a bit 2, and according to the combination, the predetermined rule set may be partitioned into:

"0" rule subset: R1 and R3, a bit string corresponding to the "0" rule subset is 1010;

"1" rule subset: R2, R3 and R4, a bit string corresponding to the "1" rule subset is 0111; and a correlation coefficient corresponding to the combination including the bit 2 is (2+3)/2=2.5.

(2) a combination includes a bit 3, and according to the combination, the predetermined rule set may be partitioned into:

"0" rule subset: R1 and R2, a bit string corresponding to the "0" rule subset is 1100;

"1" rule subset: R1, R3 and R4, a bit string corresponding to the "1" rule subset is 1011; and a correlation coefficient corresponding to the combination including the bit 3 is (2+3)/2=2.5.

[2] the number of bits included in a combination is 2:

a combination includes a bit 2 and a bit 3, and according to the combination, the predetermined rule set may be partitioned into:

"00" rule subset: R1, a bit string corresponding to the "00" rule subset is 1000;

"01" rule subset: R1 and R3, a bit string corresponding to the "01" rule subset is 1010;

"10" rule subset: R2, a bit string corresponding to the "10" rule subset is 0100;

"11" rule subset: R3 and R4, a bit string corresponding to the "11" rule subset is 0011; and a correlation coefficient corresponding to the combination including the bit 2 and the bit 3 is (1+2+1+2)/4=1.5.

The above analysis shows that the correlation coefficient corresponding to the group with the distinct number of 3 is 1.5, and the local optimum combination of bits thereof includes the bit 2 and the bit 3.

IV. correlation analysis on groups with the distinct number of 4:

The number of bits included in a combination is 1:

a combination includes a bit 7, and according to the combination, the predetermined rule set may be partitioned into:

"0" rule subset: R1, R3 and R4, a bit string corresponding to the "0" rule subset is 1011;

"1" rule subset: R1, R2 and R3, a bit string corresponding to the "1" rule subset is 1110; and a correlation coefficient corresponding to the combination including the bit 7 is (3+3)/2=3.

The above analysis shows that the correlation coefficient corresponding to the group with the distinct number of 4 is 3, and the local optimum combination of bits thereof includes the bit 7.

In the block S103 shown in FIG. 1, a local optimum combination of bits having the minimum corresponding correlation coefficient and including the fewest bits may be determined as a global optimum combination of bits by comparing all the local optimum combinations of bits.

In this block, by comparing the local optimum combinations of bits obtained through blocks S301-S303, the minimum value of correlation coefficient may be determined as 1, and the minimum number of bits in combinations with the correlation coefficient of 1 may be determined as 2. So, in this block, a local optimum combination of bits having the minimum correlation coefficient and including the fewest bits may be determined as a global optimum combination of bits. For example, the determined global optimum combination of bits may include a bit 4 and a bit 5, or may include a bit 5 and a bit 8.

In addition, in the description process above, the groups may be subjected to correlation analysis in a small-to-large distinct number sequence. In the case that the number of rules in a rule subset is restricted, for example, in the example of the rule set above, the number of rules in a rule subset may be predetermined to be not more than 1. Thus, in the description process above, when the correlation analysis on the groups with the distinct number of 0 is completed, it may be concluded that the optimum combination of bits is a combination including the bit 4 and the bit 5, or including the bit 5 and the bit 8. Therefore, the efficiency of correlation analysis may be improved, and then the efficiency of partitioning packet classification rules may be improved.

The example above shows that by carrying out correlation analysis on each group, a local optimum combination of bits of each group may be obtained, and then a global optimum combination of bits may be determined from all the local optimum combinations of bits. In such a way, bits included in the obtained global optimum combination of bits are optimum, and because the combinations including fewer bits are subjected to correlation analysis, the computational complexity is relatively low, thereby improving the efficiency of the partitioning of packet classification rules, and also making the storage space of the rule subsets obtained by partitioning as small as possible.

Corresponding to the examples of the method for partitioning packet classification rules, the present disclosure also provides examples of a device for partitioning packet classification rules.

Figure 4:
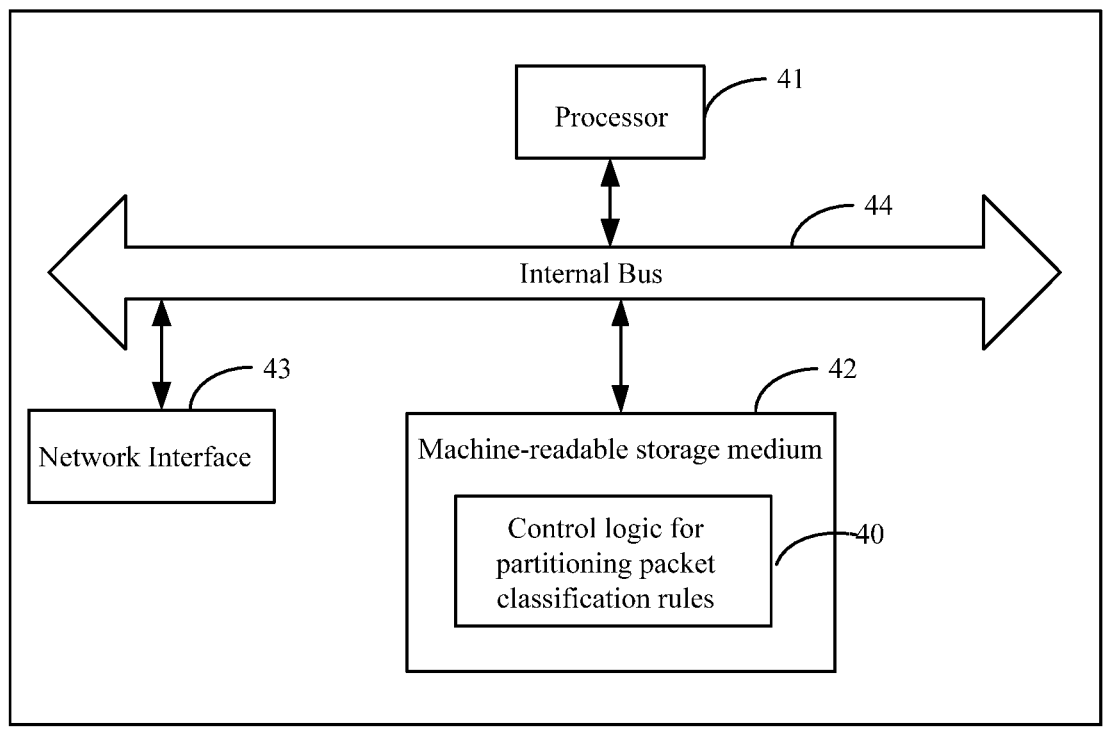
FIG. 4 is a hardware structure diagram of a device for partitioning packet classification rules according to an example of the present disclosure.

The device for partitioning packet classification rules disclosed by the present disclosure may be applied to a network device. The device for partitioning packet classification rules may be implemented by software, and also may be implemented by hardware or a combination of software and hardware. As shown in FIG. 4, a hardware structure diagram of the device for partitioning packet classification rules is provided, and the device includes a processor 41 and a machine-readable storage medium 42, wherein the processor 41 and the machine-readable storage medium 42 are usually interconnected by an internal bus 44. In the other possible modes of implementation, the device also may include a network interface 43, by which the device can communicate with other apparatuses or components. The device also may include other hardware, which is not described here.

In different examples, the machine-readable storage medium 42 may be: a RAM (Random Access Memory), a volatile memory, a non-volatile memory, a flash memory, a memory driver (such as a hard disk drive), a solid-state drive, any types of memory discs (such as CD, DVD, and the like), or a similar storage medium, or a combination thereof.

Figure 5:
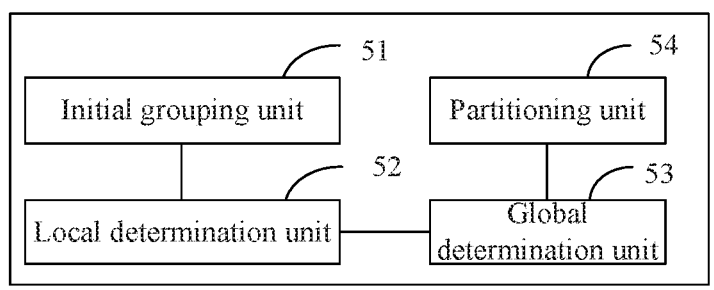
FIG. 5 is a function module diagram of a device for partitioning packet classification rules according to an example of the present disclosure.

Furthermore, machine-executable instructions corresponding to a control logic for partitioning packet classification rules 40 are stored in the machine-readable storage medium 42. Functionally, the control logic for partitioning packet classification rules 40 may include a rule set, each rule in the rule set includes m bits, and m is an integer greater than or equal to 2. The control logic for partitioning packet classification rules 40 may include: an initial grouping unit 51, a local determination unit 52, a global determination unit 53, and a partitioning unit 54, as shown in FIG. 5.

Wherein the initial grouping unit 51 may be configured to obtain one or more groups by initially grouping bits included in a rule set.

The local determination unit 52 may be configured to determine a local optimum combination of bits for each group according to a correlation analysis on the group.

The global determination unit 53 may be configured to determine a global optimum combination of bits having a minimum correlation coefficient and including fewest bits from all the local optimum combinations of bits.

The partitioning unit 54 may be configured to partition the rule set according to the global optimum combination of bits.

Figure 6:
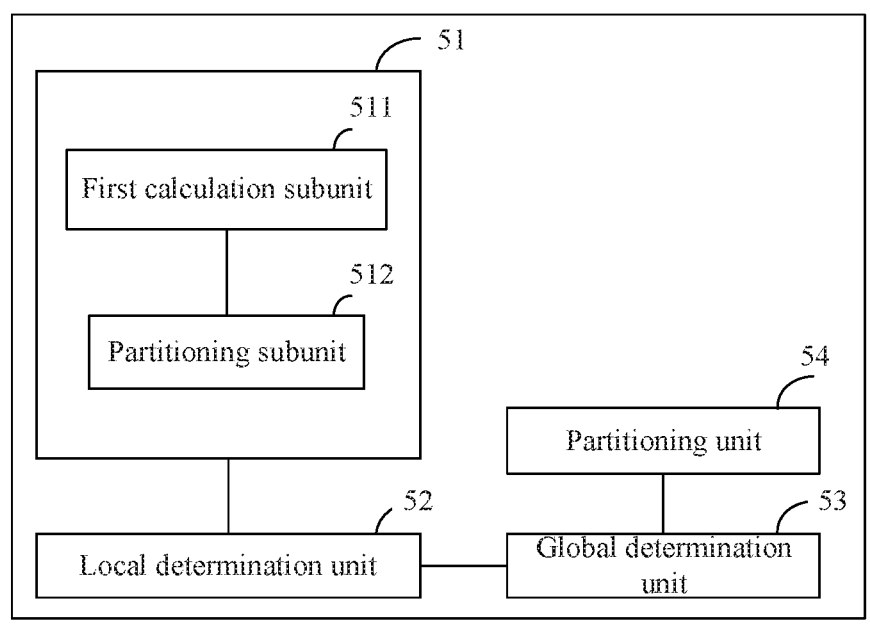
FIG. 6 is a function module diagram of a device for partitioning packet classification rules according to another example of the present disclosure.

In an example, seeing FIG. 6, the initial grouping unit 51 may include a first calculation subunit 511 and a partitioning subunit 512.

The first calculation subunit 511 may be configured to determine a distinct number for each of the bits according to a first value number, a second value number and a third value number of the bit, wherein the first value number indicates a number of rules included in the rule set in which the bit is of a first value, the second value number indicates the number of rules included in the rule set in which the bit is of a second value, and the third value number indicates the number of rules included in the rule set in which the bit is of a third value.

The partitioning subunit 512 may be configured to classify bits with the same distinct number into one group.

According to an example, the first calculation subunit 511 may be configured to determine the distinct number corresponding to the bit according to the following formula:

$$\text{distinct number} = |\text{first value number} - \text{second value number}| + n * \text{third value number},$$

wherein n is greater than zero.

Figure 7:
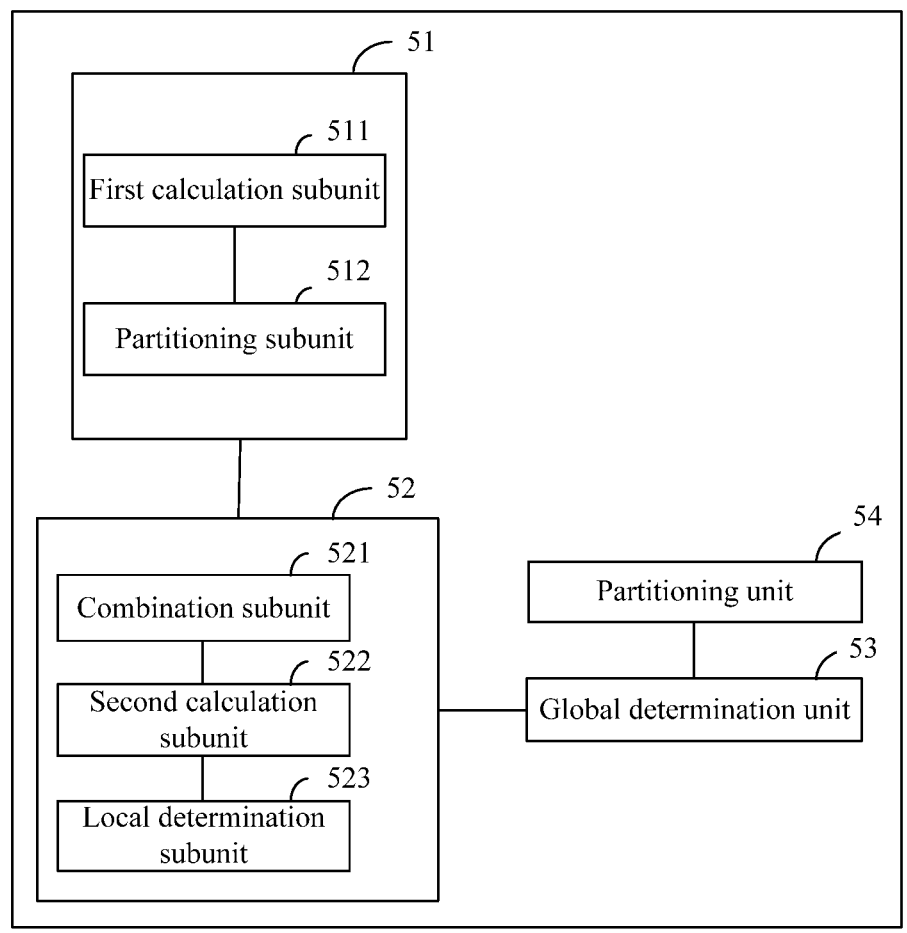
FIG. 7 is a function module diagram of a device for partitioning packet classification rules according to a yet another example of the present disclosure.

In an example, seeing FIG. 7, the local determination unit 52 may include a combination subunit 521, a second calculation subunit 522 and a local determination subunit 523.

Wherein the combination subunit 521 may be configured to, beginning from i=1, generate C (k, i) combinations of bits by selecting i bits from all k bits included in the group, wherein k is an integer greater than or equal to 1; partition the rule set into a plurality of rule subsets according to each of the C (k, i) combinations of bits, and obtain a bit string for each of the rule subsets.

The second calculation subunit 522 may be configured to determine a correlation coefficient corresponding to the combination of bits according to the bit strings of the rule subsets.

The value of i is updated by i=i+1, and the combination subunit 521 and the second calculation subunit 522 may repeat the above operation until the value of i is greater than k.

The local determination subunit 523 may be configured to determine, from all the combinations of bits, a local optimum combination of bits having the minimum correlation coefficient and including the fewest bits for the group.

According to an example, the combination subunit 521 is configured to determine whether a rule in the rule set is included in the rule subset. The combination subunit 521 may set a bit corresponding to the rule in the bit string for the rule subset to be of 1 if the rule is included in the rule subset; and set the bit corresponding to the rule in the bit string for the rule subset to be of 0 if the rule is not included in the rule subset.

According to an example, the second calculation subunit 522 may include a second determination subunit 5221 (not shown in FIG. 7) and a third calculation subunit 5222 (not shown in FIG. 7).

Wherein the second determination subunit 5221 may be configured to determine a non-zero bit number which indicates a number of bits being of 1 in all the bit strings of the rule subsets corresponding to the combination of bits, and determine a non-zero bit string number which indicates a number of bit strings of which at least one bit is of 1 in all the bit strings of the rule subsets corresponding to the combination of bits.

The third calculation subunit 5222 may be configured to obtain a correlation coefficient for the combination of bits according to a ratio of the non-zero bit number to the non-zero bit string number.

The implementation of functions of each unit in the device are specifically shown in corresponding blocks in the method above, and not repeated here.

The following takes software implementation as an example to further describe how the device for partitioning packet classification rules executes the control logic for partitioning packet classification rules 40. In this example, the control logic for partitioning packet classification rules 40 in the present disclosure may be interpreted as machine-executable instructions stored in the machine-readable storage medium 42. When the processor 41 of the device for partitioning packet classification rules disclosed by the present disclosure executes the control logic for partitioning packet classification rules 40, by invoking the machine-executable instructions corresponding to the control logic for partitioning packet classification rules 40 stored in the machine-readable storage medium 42 the processor 41 executes the following operations:

obtaining one or more groups by initially grouping bits included in a rule set, wherein each rule in the rule set includes m bits, and m is an integer greater than or equal to 2;

determining a local optimum combination of bits for each group according to a correlation analysis on the at least one group;

determining a global optimum combination of bits having a minimum correlation coefficient and comprising fewest bits from all the local optimum combinations of bits; and partitioning the rule set according to the global optimum combination of bits.

According to an example, when initially grouping the bits included in the rule set, the machine-executable instructions further cause the processor to execute the following operations:

determining a distinct number for each of the bits according to the first value number, the second value number and the third value number of the bit, wherein the first value number indicate the number of rules included in the rule set in which the bit is of a first value, the second value number indicates the number of rules included in the rule set in which the bit is of a second value, and the third value number indicates the number of rules included in the rule set in which the bit is of a third value; and classifying the bits with the same distinct number into one group.

According to an example, when determining the distinct number for each of the bits according to the first value number, the second value number and the third value number of the bit, the distinct number corresponding to the bit may be calculated according to the following formula:

$$\text{distinct number} = |\text{first value number} - \text{second value number}| + n * \text{third value number},$$

wherein n is greater than zero.

According to an example, when determining the local optimum combination of bits for each group according to a correlation analysis on the group, the machine-executable instructions further cause the processor to execute the following operations:

beginning from i=1, generating C (k, i) combinations of bits by selecting i bits from all k bits included in the group, wherein k is an integer greater than or equal to 1; partitioning the rule set into a plurality of rule subsets according to each of the C (k, i) combinations of bits, and obtaining a bit string for each of the rule subsets;

determining a correlation coefficient corresponding to the combination of bits according to the bit strings of the rule subsets, and update the i by i=i+1, regenerating C (k, i) combinations of bits until i is greater than k; and determining, from all the combinations of bits, a local optimum combination of bits having the minimum correlation coefficient and including the fewest bits for the group.

According to an example, when obtaining the bit string for each of the rule subsets, the machine-executable instructions further cause the processor to execute the following operations:

determining whether a rule in the rule set is included in the rule subset, setting a bit corresponding to the rule in the bit string for the rule subset to be of 1 if the rule is included in the rule subset; and setting the bit corresponding to the rule in the bit string for the rule subset to be of 0 if the rule is not included in the rule subset.

According to an example, when determining the correlation coefficient for the combination of bits according to the respective bit strings of the rule subsets, the machine-executable instructions further cause the processor to execute the following operations:

determining a non-zero bit number which indicates a number of bits being of 1 in all the bit strings of the rule subsets corresponding to the combination of bits, and determining a non-zero bit string number which indicates a number of bit strings of which at least one bit is of 1 in all the bit strings of the rule subsets corresponding to the combination of bits; and obtaining a correlation coefficient for the combination of bits according to a ratio of the non-zero bit number to the non-zero bit string number.

Because the examples of the device basically correspond to the examples of the method, relevant descriptions see part of descriptions of the examples of the method. The examples of the device described above are only illustrative, and the units therein described as separate components may be or may not be physically separated, and the components shown as units may be or may not be physical units, i.e., may be located in one place, or may be distributed to multiple network units. Part or all of modules therein may be selected to achieve the purpose of the scheme of the present disclosure as required. Persons of ordinary skill in the art may understand and implement the examples of the device without creative efforts.

Terms used in the present disclosure are adopted only for the purpose of describing specific embodiments, rather than to limit the present disclosure. Singular-form 'a', and 'the' used in the present disclosure and the claims are also designed to include plural form unless other meanings are clearly shown in the context. It should be understood that the term 'and/or' used in this text refers to and contains any or all possible combinations of one or more associated listed items.

It should be understood that although the terms such as first, second and third and the like may be adopted to describe all kinds of information in the present disclosure, the information should not be limited to these terms. These terms are only adopted for distinguishing same type of information from each other. For example, in the case of not departing from the scope of the present disclosure, first information also may be referred to as second information, and similarly, the second information also may be referred to as the first information. The meaning of terms depends on the context, for example, a word 'if' used here may be interpreted as 'when', 'while' or 'in response to determination'.

The above are only examples of the present disclosure, and not intended to limit the disclosure, and any changes made, equivalent replacement, or improvement and the like within the spirit and principles of the present disclosure should fall within the protection scope of the present disclosure.

The invention claimed is:

1. A method for partitioning packet classification rules, comprising:
    obtaining, by a network device, one or more groups by initially grouping bits included in a rule set on the network device, wherein each rule in the rule set comprises m bits, and m is an integer greater than 2;
    determining, by the network device, a local optimum combination of bits for each group according to a correlation analysis on the group;
    determining, by the network device, a global optimum combination of bits having a minimum correlation coefficient and comprising the least number of bits, from all the local optimum combinations of bits; and
    partitioning, by the network device, the rule set according to the global optimum combination of bits.

2. The method according to claim 1, wherein initially grouping bits included in the rule set, comprising:
    determining, by the network device, a distinct number for each of the bits according to a first value number, a second value number and a third value number of the bit, wherein the first value number of the bit is 1, the second number of the bit is 0, and the third number of the bit is * meaning an undefined value either 1 or 0, the first value number indicates a number of rules included in the rule set in which the bit is of a first value, the second value number indicates a number of rules included in the rule set in which the bit is of a second value, and the third value number indicates a number of rules included in the rule set in which the bit is of a third value; and
    classifying, by the network device, bits with a same distinct number into one group.

3. The method according to claim 2, wherein determining the distinct number for each of the bits according to the first value number, the second value number and the third value number of the bit, comprising:
    determining, by the network device, the distinct number for the bit according to the following formula:

$$\text{distinct number} = |\text{first value number} - \text{second value number}| + n * \text{third value number},$$

wherein n is greater than zero.

4. The method according to claim 1, wherein determining the local optimum combination of bits for each group according to a correlation analysis on the group, comprising:
    beginning from i=1,
        generating, by the network device, C (k, i) combinations of bits by selecting i bits from all k bits included in the group, wherein k is an integer greater than or equal to 1,
        partitioning, by the network device, the rule set into a plurality of rule subsets according to each of the C (k, i) combinations of bits, and
        obtaining, by the network device, a bit string for each of the rule subsets;
        determining, by the network device, a correlation coefficient for each of the combinations of bits according to the respective bit strings of the rule subsets;
    updating, by the network device, the i by i=i+1,
    regenerating, by the network device, C (k, i) combinations of bits until i is greater than k; and
    determining, by the network device, from all the combinations of bits, a local optimum combination of bits having the minimum correlation coefficient and including the fewest bits.

5. The method according to claim 4, wherein obtaining the bit string for each of the rule subsets, comprising:
    determining, by the network device, whether a rule in the rule set is included in the rule sub set,
    setting, by the network device, a bit corresponding to the rule in the bit string for the rule subset to be of 1 if the rule is included in the rule subset; and
    setting, by the network device, the bit corresponding to the rule in the bit string for the rule subset to be of 0 if the rule is not included in the rule subset.

6. The method according to claim 4, wherein determining the correlation coefficient for a combination of bits according to the respective bit strings of the rule subsets, comprising:
    determining, by the network device, a non-zero bit number which indicates a number of bits being of 1 in all the bit strings of the rule subsets corresponding to the combination of bits;

determining, by the network device, a non-zero bit string number which indicates a number of bit strings of which at least one bit is of 1 in all the bit strings of the rule subsets corresponding to the combination of bits; and obtaining, by the network device, a correlation coefficient for the combination of bits according to a ratio of the non-zero bit number to the non-zero bit string number.

7. A device for partitioning packet classification rules, comprising:

a processor; and a machine-readable storage medium stored with machine-executable instructions corresponding to a control logic for partitioning packet classification rule, the control logic for partitioning packet classification rule comprises a rule set, and by reading and executing the machine-executable instruction, the processor is caused to:

obtain one or more groups by initially grouping bits included in the rule set, wherein each rule in the rule set comprises m bits, and m is an integer greater than 2;

determine a local optimum combination of bits for each group according to a correlation analysis on the group;

determine a global optimum combination of bits having a minimum correlation coefficient and comprising the least number of bits, from all the local optimum combinations of bits; and partition the rule set according to the global optimum combination of bits.

8. The device according to claim 7, wherein when initially grouping bits included in the rule set, the machine-executable instructions further cause the processor to:

determine a distinct number for each of the bits according to a first value number, a second value number and a third value number of the bit, wherein the first value number of the bit is 1, the second number of the bit is 0, and the third number of the bit is * meaning an undefined value either 1 or 0, the first value number indicates a number of rules included in the rule set in which the bit is of a first value, the second value number indicates a number of rules included in the rule set in which the bit is of a second value, and the third value number indicates a number of rules included in the rule set in which the bit is of a third value; and classify the bits with a same distinct number into one group.

9. The device according to claim 8, wherein when determining the distinct number for each of the bits according to the first value number, the second value number and the third value number of the bit, the following formula is used:

distinct number=|first value number−second value number|+$n$*third value number, wherein n is greater than zero.

10. The device according to claim 7, wherein when determining the local optimum combination of bits for each group according to the correlation analysis on the group, the machine-executable instructions further cause the processor to:

beginning from i=1, generate C (k, i) combinations of bits by selecting i bits from all k bits included in the group, wherein k is an integer greater than or equal to 1, partition the rule set into a plurality of rule subsets according to each of the C (k, i) combinations of bits, and obtain a bit string for each of the rule subsets;

determine a correlation coefficient for each of the combinations of bits according to the respective bit strings of the rule subsets;

update the i by i=i+1, regenerate C (k, i) combinations of bits until i is greater than k; and determine, from all the combinations of bits, a local optimum combination of bits having the minimum correlation coefficient and including the fewest bits.

11. The device according to claim 10, wherein when obtaining the bit string for each of the rule subsets, the machine-executable instructions further cause the processor to:

determine whether a rule in the rule set is included in the rule subset, set a bit corresponding to the rule in the bit string for the rule subset to be of 0 if the rule is included in the rule subset; and set the bit corresponding to the rule in the bit string for the rule subset to be of 0 if the rule is not included in the rule subset.

12. The device according to claim 10, wherein when determining the correlation coefficient for a combination of bits according to the respective bit strings of the rule subsets, the machine-executable instructions further cause the processor to:

determine a non-zero bit number which indicates a number of bits being of 1 in all the bit strings of the rule subsets corresponding to the combination of bits;

determine a non-zero bit string number which indicates a number of bit strings of which at least one bit is of 1 in all the bit strings of the rule subsets corresponding to the combination of bits; and obtain a correlation coefficient for the combination of bits according to a ratio of the non-zero bit number to the non-zero bit string number.

* * * * *